United States Patent [19]

Cipolli et al.

[11] Patent Number: 5,380,815
[45] Date of Patent: Jan. 10, 1995

[54] MELAMINIC POLYCONDENSATES

[75] Inventors: Roberto Cipolli, Novara; Roberto Oriani, Milan; Enrico Masarati, Castelnuovo Valtidone; Gilberto Nucida, San Giuliano Milanese, all of Italy

[73] Assignee: Ministero Dell 'Universita' E Della Ricerca Scientifica E Tecnologica, Rome, Italy

[21] Appl. No.: 976,423

[22] Filed: Nov. 13, 1992

[30] Foreign Application Priority Data

Nov. 14, 1991 [IT] Italy .................. MI.91-A/003037

[51] Int. Cl.⁶ .................. C08G 12/30; C08G 12/02
[52] U.S. Cl. ................ 528/254; 528/248; 528/256; 528/257; 528/258; 524/96; 524/97; 524/100
[58] Field of Search ............ 528/254, 248, 256, 257, 528/258; 524/100, 96, 97

[56] References Cited

U.S. PATENT DOCUMENTS

| | | | |
|---|---|---|---|
| 2,584,177 | 2/1959 | Wohnsiedler et al. | 528/254 |
| 3,327,018 | 6/1967 | D'Alelio | 528/254 |
| 3,481,903 | 12/1969 | D'Alelio et al. | |
| 3,839,289 | 10/1974 | Waitkus | 528/254 |
| 3,860,547 | 1/1975 | Faessinger et al. | 528/254 |
| 4,081,426 | 3/1978 | Michel et al. | 528/254 |
| 4,310,447 | 1/1982 | Weber et al. | 528/254 |
| 4,369,286 | 1/1983 | Czepel et al. | 528/254 |
| 4,528,344 | 7/1985 | Chang | 528/254 |
| 4,977,237 | 12/1990 | Garrigue et al. | 528/256 |
| 4,977,238 | 12/1990 | Garrigue et al. | 528/256 |
| 5,124,379 | 6/1992 | Cipolli et al. | 524/100 |
| 5,162,462 | 11/1992 | Barthomieux et al. | 528/258 |

FOREIGN PATENT DOCUMENTS

| | | |
|---|---|---|
| 0221330 | 5/1987 | European Pat. Off. |
| 0406810 | 1/1991 | European Pat. Off. |
| 451807 | 10/1991 | European Pat. Off. |
| 475418 | 3/1992 | European Pat. Off. |
| 1065338 | 1/1954 | France . |
| 2055107 | 5/1972 | Germany . |
| 623355 | 5/1949 | United Kingdom ........ 528/254 |
| 915576 | 1/1963 | United Kingdom ........ 528/254 |

*Primary Examiner*—John Kight, III
*Assistant Examiner*—P. Hampton-Hightower
*Attorney, Agent, or Firm*—Oblon, Spivak, McClelland, Maier & Neustadt

[57] ABSTRACT

Condensation compounds obtained by means of the polymerization of polyaminic compositions essentially constituted by derivatives of 2,4,6-triamino-1,3,5-triazine having the general formula (I):

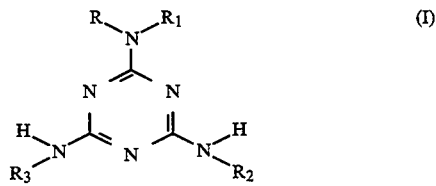

with aldehydes, preferably formaldehyde.

14 Claims, No Drawings

MELAMINIC POLYCONDENSATES

The present invention relates to compounds obtained by means of polycondensation of polyaminic compositions, essentially constituted by melaminic derivatives, with aldehydes.

More particularly, the present invention relates to compounds of condensation with aldehydes, preferably formaldehyde, of derivatives of 2,4,6-triamino-1,3,5-triazine.

These compounds are used in the preparation of self-extinguishing polymeric compositions, based on thermoplastic polymers, or polymers endowed with elastomeric properties, in particular olefinic polymers or copolymers, in combination with ammonium or amine phosphates and/or phosphonates.

In particular, the subject matter of the present invention are the aminoplastic resins obtained by means of the polymerisation of a mixture comprising:

(1) from 0 to 50 parts by weight of one or more polyaminic derivatives;

(2) from 50 to 100 parts by weight of one or more derivatives of 2,4,6-triamino-1,3,5-triazine having the general formula (I):

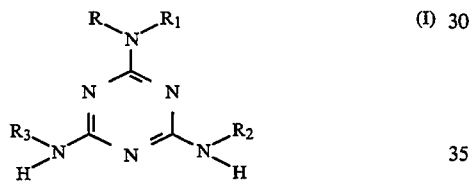

with formaldehyde or a mixture of formaldehyde and an aldehyde having the general formula (II)

$$R_4-CHO \qquad (II)$$

wherein the aldehyde having the general formula (II) can be present in an amount of up to 20% by mol, and wherein at least one of radicals from R to $R_3$ is:

$$CH_2 + C_mH_{2m} + O - R_5 - ;$$

$$-CH_2 + C_pH_{2p} + N(R_6)_2 - ;$$

wherein:

m = an integer comprised within the range of from 1 to 7;

p = an integer comprised within the range of from 1 to 5;

$R_5$ = H; $C_1$–$C_8$ alkyl; $C_2$–$C_6$ alkenyl; $-[-C_qH_{2q}-]-O-R_7$ wherein q is an integer comprised within the range of from 1 to 4 and $R_7$ is H or $C_1$–$C_4$ alkyl; $C_6$–$C_{12}$ cycloalkyl or alkylcycloalkyl;

the radicals $R_6$, which may be the same or different from each other, are:

H; $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

is replaced by a heterocyclic radical linked to the alkyl chain through the nitrogen atom, and possibly containing another heteroatom preferably selected from O, S, N;

or in the general formula (I) the moiety:

is replaced by a heterocyclic radical linked to the triazinic ring through the nitrogen atom, and possibly containing another heteroatom preferably selected from O, S, N;

the other radicals from R to $R_3$, which may be the same or different from one another, have the above said meaning, or they are:

H; $C_1$–$C_{18}$ alkyl; $C_2$–$C_8$ alkenyl; $C_6$–$C_{16}$ cycloalkyl or alkylcycloalkyl, possibily substituted with a hydroxy or $C_1$–$C_4$ hydroxyalkyl function.

$R_4$ is $C_1$–$C_8$ alkyl; $C_2$–$C_6$ alkenyl; $C_6$–$C_{12}$ cycloalkyl; $C_6$–$C_{12}$ aryl, possibly substituted with one or more $C_1$–$C_4$ alkyl radicals; aralkyl $C_7$–$C_{16}$; aralkenyl $C_8$–$C_{12}$.

According to a preferred form of practical embodiment of the aminoplastic resins according to the present invention, the polyaminic derivative is selected from compounds containing the 1,3,5-triazine ring, or at least one moiety

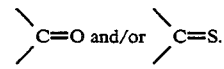

Examples of radicals from R to $R_3$ in general formula (I) are:

methyl; ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino) ethyl; 3-(N,N-dimethylamino) propyl; 4-(N,N-dimethylamino) butyl; 5-(N,N-dimethylamino) pentyl; 4-(N,N-diethylamino) butyl; 5-(N,N-diethylamino) pentyl; 5-(N,N-diisopropylamino) pentyl; 3-(N-ethylamino) propyl; 4-(N-methylamino) butyl; 4-(N,N-dipropylamino) butyl; 2-(N,N-diisopropylamino)

ethyl; 6-(N-hexenylamino) hexyl; 2-(N-ethenylamino) ethyl; 2-(N-cyclohexylamino) ethyl; 2-(N-2-hydroxyethylamino) ethyl; 2-(2-hydroxyethoxy) ethyl; 2-(2-methoxyethoxy) ethyl; 6-(N-propylamino) hexyl; and so forth.

Examples of heterocyclic radicals which may replace the moiety:

in general formula (I) are:
aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

are:
aziridine; pyrrolidine; piperidine; morpholine; thiomorpholine; piperazine; 4-methylpiperazine; 4-ethylpiperazine; and so forth.

By "formaldehyde", as this term is used in the instant disclosure and in the appended claims, any forms are meant, in which formaldehyde is usually marketed: aqueous solution, metaformaldehyde, paraformaldehyde.

Examples of $R_4$ radical in general formula (II) are:
methyl; ethyl; n-propyl; isopropyl; n-butyl; isobutyl; tert-butyl; n-pentyl; isopentyl; n-hexyl; n-eptyl; isoeptyl; n-octyl; ethenyl; propenyl; isobutenyl; Sec-butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; 2-phenylethenyl; and so forth.

Examples of polyaminic derivatives are:
urea; ethyleneurea; thiourea; ethylenethiourea; propyleneurea; melamine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

The aminoplastic resins according to the present invention can be synthetized as follows:
(a) by reacting in a suitable solvent (such as, e.g., water, methyl alcohol, ethyl alcohol, or their mixtures, and so forth), the derivative of 2,4,6-triamino-1,3,5-triazine having the general formula (I), either mixed or not mixed with the polyaminic derivative, with formaldehyde or a mixture of formaldehyde and an aldehyde of general formula (II). The molar ratio of the derivative of general formula (I), or of its mixture with the polyaminic derivative, to formaldehyde, or to the mixture of formaldehyde with the aldehyde of general formula (II), is comprised within the range of from 1:1 to 1:6. The reaction is carried out at a pH value comprised within the range of from 7 to 12, possibily obtained by adding an alkali (such as, for example, potassium carbonate, sodium carbonate, sodium hydroxide, and so forth), at temperatures comprised within the range of from 20° C. to solvent boiling point, until a solution is obtained;

(b) causing the resulting reaction product, constituted by the alkylol derivative, to turn into a resin by feeding it to a mixture of the same solvent, acidified at a pH value comprised within the range of from 1 to 5, by means of the addition of an acid such as, e.g., sulfuric acid, hydrochloric acid, phosphoric acid, and so forth) and heated at a temperature comprised within the range of from 40° C. to the boiling point of the solvent. The resin is formed as a white, finely subdivided solid material. The resulting dispersion is kept further stirred at the selected temperature, during the necessary time to complete the polymerization process, preferably of from 1 to 12 hours. The acidity of the resulting mixture is then neutralized with a base selected from those suggested hereinabove, and the resulting product is filtered off.

The resin is first dried at 100° C., then is submitted to thermal treatment for some hours, preferably of from 1 to 3 hours, in a vacuum oven at 150° C.

In general good quality aminoplastic resins are obtained as white crystalline powders, which are insoluble in water and can be used in self-extinguishing polymeric compositions without further purification.

An alternative synthesis method consists in causing the reactions of the above (a) and (b) steps take place in one single step, at a pH value comprised within the range of from 1 to 5, and at higher temperature than 40° C.

Many of derivatives of 2,4,6-triamino-1,3,5-triazine of general formula (I) are known; they can anyway be easily synthetized according to as disclosed European Patent application publication No. 406,810, the same Applicant's name.

Condensation compounds obtained by means of the polymerization with aldehydes, preferably formaldehyde, of the melaminic derivatives of general formula (I), either containing or not containing polyaminic derivatives, not cited in the examples, are those reported in table 1,

TABLE 1

| COMPOUND N° | Derivative of General Formula (I) | | | Polyaminic derivative | | $R_4$—CHO | | Molar ratio polyamines/ aldehydes |
|---|---|---|---|---|---|---|---|---|
| | R—N—$R_1$ | $R_2$ | $R_3$ | Designation | % by weight $R_4$ | Mol % | | |
| 1 | ⟨N  NH⟩ | H | H | — | | — | | 1:6 |

TABLE 1-continued

| COMPOUND N° | Derivative of General Formula (I) R—N—R₁ | R₂ | R₃ | Polyaminic derivative Designation | % by weight | R₄—CHO R₄ | Mol % | Molar ratio polyamines/ aldehydes |
|---|---|---|---|---|---|---|---|---|
| 2 | CH₂CH₂OCH₃ H | H | H | Benzoguanamine | 30 | — | — | 1:3 |
| 3 | (CH₂)₅OH H | H | H | — | | — | — | 1:5 |
| 4 | morpholino (N—O ring) | H | H | — | | n-C₃H₇ | 10 | 1:1.5 |
| 5 | morpholino (N—O ring) | H | H | Acetoguanamine | 25 | — | — | 1:2.5 |
| 6 | (CH₂)₂OH | cyclohexyl | H | H | — | | — | — | 1:2 |
| 7 | (CH₂)₃N(C₂H₅)₂ H | H | H | — | | — | — | 1:4 |
| 8 | CH₂CH₂OH H | H | H | Ethyleneurea | 15 | — | — | 1:2 |
| 9 | CH₂CH₂OCH₃ H | CH₂CH₂OCH₃ | H | Succino-guanamine | 15 | — | — | 1:2.8 |
| 10 | CH₂CH₂OH H | H | H | urea | 20 | — | — | 1:2.5 |
| 11 | thiomorpholino (N—S ring) | H | H | — | | i-C₄H₉ | 5 | 1:2 |
| 12 | morpholino (N—O ring) | t-C₄H₉ | H | — | | — | — | 1:3 |
| 13 | pyrrolidino (N ring) | H | H | — | | — | — | 1:2.5 |
| 14 | (CH₂)₂OCH₃ (CH₂)₂OCH₃ | H | H | Benzyl-guanamine | 15 | — | — | 1:3 |
| 15 | (CH₂)₂O(CH₂)₂OH H | H | H | — | | — | — | 1:4 |
| 16 | thiomorpholino (N—S ring) | H | H | Ethyleneurea | 25 | — | — | 1:1.5 |
| 17 | CH₂CH₂OH H | H | H | Melamine | 30 | — | — | 1:5 |
| 18 | (CH₂)₃OCH₃ H | (CH₂)₃OCH₃ | (CH₂)₃OCH₃ | — | | — | — | 1:2.8 |
| 19 | N-methylpiperazino (N—N—CH₃ ring) | H | H | Melamine | 50 | — | — | 1:4.5 |
| 20 | CH₂CH₂OH H | CH₂CH₂OH | H | — | | — | — | 1:3 |
| 21 | thiomorpholino (N—S ring) | H | H | — | | — | — | 1:2 |
| 22 | (CH₂)₃OC₂H₅ H | H | H | — | | — | — | 1:2.5 |

TABLE 1-continued

| COMPOUND N° | Derivative of General Formula (I) R—N—R₁ | R₂ | R₃ | Polyaminic derivative Designation | Polyaminic derivative % by weight | R₄—CHO R₄ | R₄—CHO Mol % | Molar ratio polyamines/aldehydes |
|---|---|---|---|---|---|---|---|---|
| 23 |  N—O (piperidine/morpholine ring) | (CH₂)₂OCH₃ | H | — | — | — | — | 1:1 |
| 24 |  N—O | H | H | Piperazine-2,5-dione | 10 | — | — | 1:3 |
| 25 | 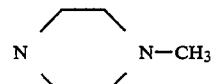 N—N—CH₃ | H | H | — | — | C₂H₅ | 15 | 1:2.5 |
| 26 | 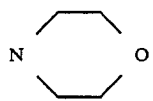 N—O | H | H | Melamine | 25 | i-C₃H₇ | 8 | 1:3.5 |
| 27 | CH₂CH₂OCH₃ | H | C₂H₅ | C₂H₅ | — | — | — | 1:2.5 |

The examples reported in the following illustrate the characteristics of the invention without limiting it.

EXAMPLE 1

184.5 g of cyanuric chloride and 800 cm³ of acetone are charged to a reactor of 3 liters of capacity, equipped with stirrer, thermometer, dripping funnel, reflux condenser and heating bath.

With stirring, the reaction mixture is heated up to 40° C. in order to obtain a solution, then 284 g of an aqueous solution of ammonia at 30% by weight are added during a 1 hour and 30 minutes time.

The reaction mixture is subsequently heated up to 45° C. and is kept 4 hours at this temperature.

After cooling, the resulting product is filtered off and is washed on the filter with water.

After oven drying at 50°–60° C. under vacuum, 113 g of intermediate (III):

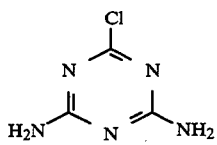

(III)

are obtained as a white, infusible, crystalline powder containing 24.12% of chlorine (theoretical chlorine content=24.36).

72.8 g of intermediate (III), 350 cm³ of water and then, with stirring, 44 g of piperidine are charged to a reaction vessel of 1 liter of capacity equipped with stirrer, thermometer, addition funnel, reflux condenser and heating bath.

The reaction mixture is heated up to boiling temperature and then is kept under refluxing conditions for 4 hours.

The reaction mixture is then caused to reflux for a further 8 hours, with 20 g of sodium hydroxide in 50 cm³ of water being added portionwise, so as to keep the reaction mixture pH value comprised within the range of from 7 to 8.

The reaction mixture is cooled down to room temperature, the resulting product is filtered off, and the filter cake is washed on the same filter with cold water.

After drying in an oven at 60° C. under vacuum, 90 g of 2,4-diamino-6-piperidino-1,3,5-triazine (IV):

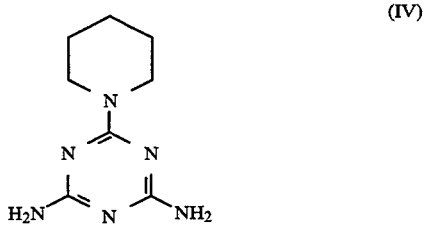

(IV)

are obtained as a white crystal powder having m.p.=215°–217° C. (m.p.=melting point).

The structure of intermediates (III) and (IV) was confirmed by IR spectroscopic analysis.

300 cm³ of water, 0.7 g of sodium carbonate, 114.3 g of an aqueous solution at 37% by weight of formaldehyde and, with stirring, 78 g of intermediate (IV) are charged to the same reactor of 1 liter of capacity.

The reaction mass is heated up to 65° C., until a solution is obtained (about 1 hour).

The resulting solution, kept at 65° C., is added, during a 2 hour time, to a reactor of 2 liters of capacity, equipped in the same way as the preceding reactors, containing 380 cm³ of water and 3.0 g of sulfuric acid at 96%, heated at 90°–95° C. A white precipitate is formed.

When addition is complete, the resulting dispersion is heated up to boiling temperature and is kept refluxing for 3 hours.

Then 450 cm³ of water are added, with the temperature being allowed to decrease down to 60° C., and the reaction mass is subsequently neutralized by adding 2.4 g of sodium carbonate.

The reaction mass is kept at the temperature of 60° C. for 1 hour, and the resulting product is subsequently filtered, with the filter cake being washed on the same filter with hot water.

By drying the filter cake in an oven at 100° C., and subsequently submitting it to a thermal treatment at 150° C. for 2 hours under vacuum, 84.8 g of resin are obtained as a white crystalline powder having a melting point higher than 300° C.

EXAMPLE 2

91 g of intermediate (III), 240 cm³ of toluene and 100 g of morpholine are charged to the same reaction equipment of 1 liter of capacity as disclosed in Example 1.

The reaction mixture is heated up to 65°–70° C. and is kept at that temperature for 2 hours; the reaction mixture is then heated up to boiling temperature and is kept refluxing for 1 hour.

The reaction mixture is allowed to cool down to room temperature, and then the resulting product is isolated by filtration. The filter cake is washed with plentiful water, and, after drying, 92 g of 2,4-diamino-6-morpholino-1,3,5-triazine (V):

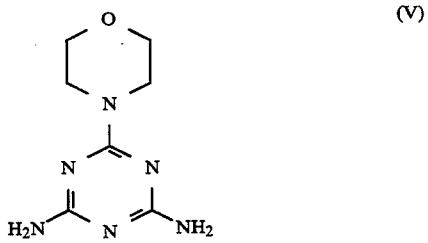

are obtained as a white crystalline powder with m.p. = 248°–250° C.

The structure of intermediate (V) was confirmed by NMR analysis.

300 cm³ of water, 0.7 g of sodium carbonate, 91.2 g of a solution at 37% by weight of formaldehyde, and, with stirring, 73.5 g of intermediate (V) are charged to the same reactor of 1 liter of capacity.

The reaction mass is heated at 65° C. for 15 minutes, until a solution is obtained.

Such a solution, kept at 65° C., is fed, during a 2 hour time, to the same reactor of 2 liters of capacity disclosed in Example 1, containing 350 cm³ of water and 3.0 g of sulfuric acid at 96%, heated at 90° C.

A white solid is formed. The reaction mixture is heated up to boiling temperature and is kept under refluxing conditions for 3 hours.

450 cm³ of water are added, with the temperature being allowed to decrease down to 60° C., and the reaction mass is neutralized by means of the addition of 2.4 g of sodium carbonate.

Then, proceeding as disclosed in Example 1, 77.3 g of resin are obtained as a white crystalline powder having a melting point higher than 300° C.

EXAMPLE 3

184.5 g of cyanuric chloride and 1300 cm³ of methylene chloride are charged to the same equipment of 3 liters of capacity as disclosed in Example 1, but initially equipped with a cooling bath.

With cooling from the outside, 87.2 g of morpholine and 40 g of sodium hydroxide dissolved in 150 cm³ are simultaneously added during a 3 hour time, with the reaction pH being kept comprised within the range of from 5 to 7, and the temperature being kept comprised within the range of from 0° to 3° C.

The temperature of 0°–3° C. is maintained for a further 3 hours, then the aqueous phase is separated.

By distilling methylene chloride off, 230 g of intermediate (VI):

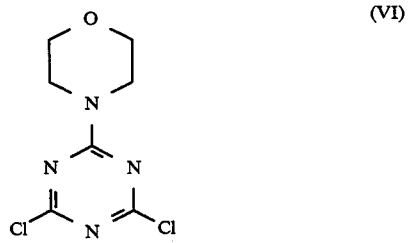

is obtained as a white crystalline powder with m.p. = 155°–157° C.; purity higher than 98% (as determined by gas-chromatography) and a chlorine content of 29.87% (theoretical value: 30.21%).

100 g of a solution at 30% by weight of ammonia, 100 cm³ of water and 70.5 g of intermediate (VI) are charged to a reactor of 0.5 liter of capacity, equipped as in Example 1.

The reaction mixture is firstly heated up to 50° C. and is kept 7 hours at this temperature; then is allowed to cool down to room temperature and the obtained product is filtered off and the filter cake is washed with water.

By drying the filter cake, 58 g of intermediate (VII):

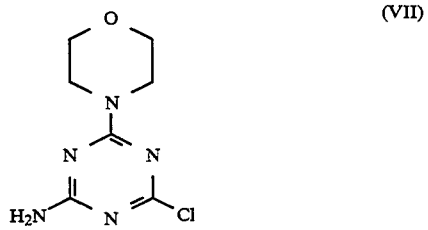

are obtained as a white crystalline powder with m.p. = 189°–191° C. and a chlorine content of 16.28% (theoretical value: 16.47%).

The structure of intermediates (VI) and (VII) was also confirmed by IR spectroscopic analysis.

58 g of intermediate (VII) and 300 cm³ of water and then, with stirring, 18 g of 2-aminoethanol are charged to the same reaction equipment as disclosed above.

The reaction mixture is heated up to boiling temperature and is allowed to reflux for 3 hours.

The reaction mixture is then allowed to reflux for a further 3 hours, while 11.8 g of sodium hydroxide in 50 cm³ of water are added portionwise, so as to keep the reaction pH value comprised within the range of from 7 to 8.

The reaction mass is cooled, the resulting product is filtered off, and the filter cake is washed with water.

After drying, 58 g of 2-amino-4-(2-hydroxyethyl)amino-6-morpholino-1,3,5-triazine (VIII):

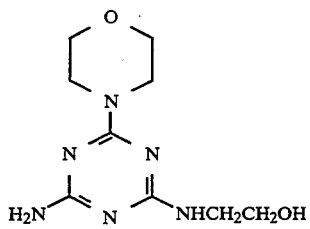

(VIII)

are obtained as a white crystalline powder with a melting point of 159°–161° C.

The structure of intermediate (VIII) was confirmed by IR spectroscopic analysis.

200 cm³ of water, 51.1 g of a solution at 37% by weight of formaldehyde, and, with stirring, 50.0 g of intermediate (VIII) are charged to the same reaction apparatus of 0.5 liter of capacity.

The reaction mixture is kept heated at 60° C. during 45 minutes, until a solution is obtained.

The resulting solution, kept at 60° C., is added during a 2 hour time to a reactor of 1 liter of capacity, fitted as the preceding ones, containing 250 cm³ of water and 3.7 g of an aqueous solution at 37% by weight of hydrochloric acid, heated at 90°–95° C. A white solid material is formed.

The reaction mass is heated up to boiling temperature and is kept refluxing for 3 hours.

250 cm³ of water are added, with the reaction temperature being allowed to decrease down to 60° C., and the reaction mass is neutralized by means of the addition of 1.5 g of sodium hydroxide.

Then, proceeding as disclosed in Example 1, 52.1 g of resin are obtained as a white crystalline powder having m.p. higher than 300° C.

EXAMPLE 4

100 cm³ of methanol, 101.5 g of a solution at 37% by weight of formaldehyde and, with stirring, 49.0 g of intermediate (V) of Example 2 and 31.5 g of 2,4,6-triamino-1,3,5-triazine (melamine) are added to the same reaction equipment of 0.5 liter of capacity as disclosed in Example 3.

The reaction mass is heated up to 70° C. for 45 minutes, until a solution is obtained.

The resulting solution, kept at 70° C., is fed during a 30 minute time to a reactor of 2 liters of capacity fitted as the preceding reactors, containing 400 cm³ of water, 200 cm³ of methanol and 2.9 g of phosphoric acid at 85% by weight, heated up to 75° C.

A precipitate is not immediately formed.

Therefore, the solution is heated up to its boiling temperature and is kept refluxing for approximately 8 hours, during which a white solid precipitates.

350 cm³ of water are added, with the dispersion temperature being allowed to decrease down to 60° C., and the dispersion is neutralized by means of the addition of 3.1 g of sodium hydroxide.

Then, by proceeding according to the operating modalities as disclosed in Example 1, 90 g of resin are obtained as a white crystalline powder having a melting point higher than 300° C.

EXAMPLE 5

350 cm³ of water, 72.8 g of intermediate (III) of Example 1, and then, with stirring, 68 g of N,N-bis (2-methoxyethyl) amine are charged to the same reactor of 1 liter of capacity as disclosed in Example 1.

The reaction mixture is heated up to boiling and is kept under refluxing conditions for 4 hours.

The reaction mixture is then allowed to reflux for a further 8 hours, while 20 g of sodium hydroxide in 50 cm³ of water are added portionwise, in order to keep the reaction pH value comprised within the range of from 7 to 8.

The reaction mixture is cooled down to room temperature, the resulting product is filtered off and the filter cake is washed on the same filter with water.

After drying in an oven at 60° C. under vacuum, 90 g of 2,4-diamino-6-bis (2-methoxyethyl) amino-1,3,5-triazine (IX):

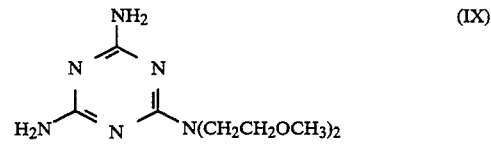

(IX)

are obtained as a white crystalline powder having m.p.=124°–128° C.

The structure of intermediate (IX) was confirmed by NMR analysis.

320 cm³ of water, 1.0 g of potassium carbonate, 30 g of paraformaldehyde and, with stirring, 80.0 g of intermediate (IX) are charged to the same reactor of 1 liter of capacity.

The reaction mass is heated up to 60° C. for 20 minutes, until a solution is obtained.

The resulting solution, kept at 60° C., is added during a 1 hour time to a reactor of 2 liters of capacity, equipped as the preceding ones, containing 400 cm³ of water and 3.2 g of sulfuric acid at 96%, heated at 90° C.

A white precipitate is formed.

The reaction dispersion is kept at 90° C. for a further 4 hours, then 500 cm³ of water are added, with the reaction temperature being allowed to decrease down to 50° C., and the reaction mass is neutralized by means of the addition of 3.2 g of potassium carbonate.

By subsequently proceeding as disclosed in Example 1, 88.7 g of resin are obtained as a crystalline white powder having a melting point higher than 300° C.

EXAMPLE 6–16

By operating under analogous conditions to as disclosed in Examples from 1 to 5, the polycondensation products are prepared which are obtained by reacting with formaldehyde the melaminic derivatives of general formula (I), either containing or not containing polyaminic derivatives, which are reported in following Table 2, and having a melting point higher than 300° C.

TABLE 2

| EXAMPLE N° | Derivative of General Formula (I) | | | Polyaminic derivative | | $R_4$—CHO | | Molar ratio polyamines/ aldehydes |
|---|---|---|---|---|---|---|---|---|
| | R—N—$R_1$ | $R_2$ | $R_3$ | Designation | % by weight | $R_4$ | Mol % | |
| 6 | $CH_2CH_2OH$ | H | H | H | — | — | | 1:2.5 |

TABLE 2-continued

| EXAMPLE N° | Derivative of General Formula (I) R—N—R₁ | R₂ | R₃ | Polyaminic derivative Designation | % by weight | R₄—CHO R₄ | Mol % | Molar ratio polyamines/ aldehydes |
|---|---|---|---|---|---|---|---|---|
| 7 | N⟨⟩O (ring) | $CH_2-CH=CH_2$ | H | — | | — | | 1:2.5 |
| 8 | N⟨⟩N—CH₃ (ring) | H | H | — | | — | | 1:3 |
| 9 | $CH_2CH_2OH$ | H | $CH_2CH_2OH$ | $CH_2CH_2OH$ | | — | | 1:2.2 |
| 10 | $(CH_2)_3$N⟨⟩O (ring) | H | H | H | | — | | 1:2.5 |
| 11 | N⟨⟩O (ring) | H | H | Ethyleneurea | 40 | — | | 1:1.4 |
| 12 | $(CH_2)_2OCH=CH_2$ | H | H | H | | — | | 1:3 |
| 13 | $(CH_2)_2OH$ | $(CH_2)_2OH$ | H | H | | — | | 1:2.5 |
| 14 | N⟨⟩N—H (ring) | H | H | | | — | | 1:5 |
| 15 | $CH_2CH_2OCH_3$ | H | $(CH_2)_2OCH_3$ | $(CH_2)_2OCH_3$ | | — | | 1:3 |
| 16 | $CH_2CH_2OH$ | H | $CH_2CH_2OH$ | H | | — | | 1:2.4 |

EXAMPLE 17

70 g of isotactic polypropylene flakes, having a Melt Flow Index equal to 12 and containing 96% by weight of a fraction insoluble in n-heptane; 8.3 g of the product of Example 3; 20.7 g of ammonium polyphosphate (Exolit 422 ex Hoechst); 0.67 g of dilauryl-thiopropionate and 0.33 g of pentaerythritol tetra[3-(3,5-di-tert-butyl-4-hydroxyphenyl)propionate] are blended and moulded on a MOORE platen press, by operating for 7 minutes at a pressure of 40 kg/cm².

Specimens are obtained as small slabs of approximately 3 mm of thickness, and on them the level of self-extinguishment is determined by measuring the oxygen index (L.O.I. according to ASTM D-2863/77) on a STANTON REDCROFT instrument, and applying the "Vertical Burning Test", which makes it possible the material to be classified at the three levels 94 V-0, 94 V-1 and 94 V-2 according to UL 94 standards (published by "Underwriters Laboratories"-USA).

The following results were obtained:
L.O.I.=37.5
UL 94=Class V-0.

We claim:

1. Resins obtained by polymerization of a mixture comprising:
   (1) from 0 to 50 parts by weight of one or more polyaminic compounds other than (2) below;
   (2) from 50 to 100 parts by weight of one or more derivatives of 2,4,6-triamino-1,3,5-triazine having the general formula (I):

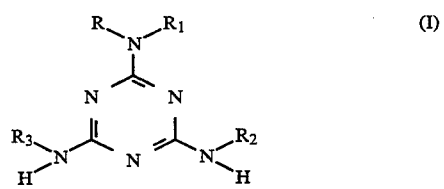

with either formaldehyde or a mixture of formaldehyde and another aldehyde having the general formula (II):

wherein the aldehyde having general formula (II) is present in an amount of up to 20% by mol, and wherein at least one of radicals from R to R₃ is:

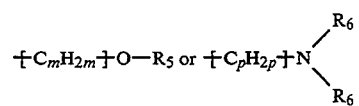

wherein:
m is an integer of from 2 to 8;
p is an integer of from 2 to 6;
$R_5$ is H; $C_1-C_8$ alkyl; $C_2-C_6$ alkenyl; or —[—$C_qH_{2q}$—]—O—$R_7$ wherein q is an integer of from 1 to 4 and $R_7$ is H or $C_1$–$C_4$ alkyl; $C_6$–$C_{12}$ cycloalkyl or alkylcycloalkyl; the radicals $R_6$, which are the same or different from each other, are:

H; $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

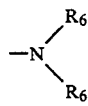

is replaced by a heterocyclic radical linked to the alkyl chain through the nitrogen atom, optionally containing another heteroatom;
or in the general formula (I) the moiety:

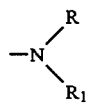

is replaced by a heterocyclic radical linked to the triazinic ring through the nitrogen atom, optionally containing another heteroatom;
the other radicals from R to $R_3$, which are the same or different from one another, have the above said meaning, or they are:
H; $C_1$–$C_{18}$ alkyl; $C_2$–$C_8$ alkenyl; $C_6$–$C_{16}$ cycloalkyl or alkylcycloalkyl, optionally substituted with a hydroxy or $C_1$–$C_4$ hydroxyalkyl function;
$R_4$ is $C_1$–$C_8$ alkyl; $C_2$–$C_6$ alkenyl; $C_6$–$C_{12}$ cycloalkyl; $C_6$–$C_{12}$ aryl, optionally substituted with one or more $C_1$–$C_4$ alkyl; aralkyl $C_7$–$C_{16}$; or aralkenyl $C_8$–$C_{12}$ radicals.

2. Resins according to claim 1, in which the polyaminic derivative is selected from compounds containing the 1,3,5-triazine ring, or at least one moiety

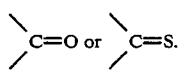

3. Resins according to claims 1 or 2, in which the moiety:

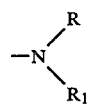

in general formula (I) is replaced by heterocyclic radicals selected from: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tertramethylpiperazine; 2,2,5,5-tetramethylpiperazine; 2-ethylpiperazine; or 2,5-diethylpiperazine.

4. Resins according to claims 1 or 2, in which the moiety:

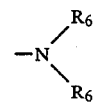

is replaced by a heterocyclic radical selected from: aziridine; pyrrolidine; piperidine; morpholine; thiomorpholine; piperazine; 4-methylpiperazine; or 4-ethylpiperazine.

5. Resins according to claims 1 or 2, in which the polyaminic derivative is selected from:
urea ethyleneurea; propyleneurea; thiourea; ethylenethiourea; melamine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; or barbituric acid.

6. Resins according to claims 1 or 2, in which $R_4$ radical selected from: methyl; ethyl; n-propyl; isopropyl; n-butyl; isobutyl; tert-butyl; n-pentyl; isopentyl; n-hexyl; n-eptyl; isoeptyl; n-octyl; ethenyl; propenyl; isobutenyl; sec-butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; or 2-phenylethenyl, 7. Process for preparing the resins according to claims 1 or 2, comprising the steps of:
(a) reacting the derivative of general formula (I), either mixed with the polyaminic derivative or not mixed with it, with formaldehyde or a mixture of formaldehyde containing up to 20% by mol of an aldehyde of general formula (II);
(b) acidifying the resulting reaction product to a pH within the range of from 1 to 5.

8. Process according to claim 7, in which step (a) is carried out with a molar ratio of the derivative of general formula (I), or its mixture with the polyaminic derivative, to formaldehyde, or its mixture with the aldehyde of general formula (II), comprised within the range of from 1:1 to 1:6.

9. Process according to claim 7 or 8 in which steps (a) and (b) are carried out at a temperature higher than 40° C.

10. Process according to claim 7 in which the reactions of (a) and (b) stages are carried out in one step at a temperature higher than 40° C.

11. Resins obtained by polymerization of a mixture comprising:
(1) from 0 to 50 parts by weight of one or more polyaminic compounds;
(2) from 50 to 100 parts by weight of one or more derivatives of the 2,4,6-triamino-1,3,5-triazine having the general formula (I):

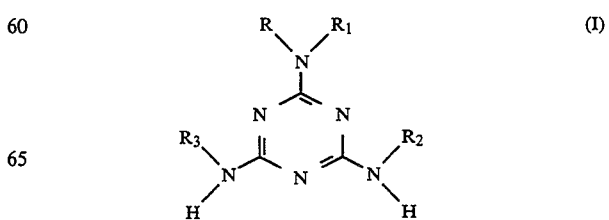

with either formaldehyde or a mixture of formaldehyde and another aldehyde having the general formula (II):

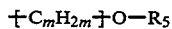 (II)

wherein the aldehyde having general formula (II) is present in an amount of up to 20% by mol, and wherein at least one of radicals from R to $R_3$ is:

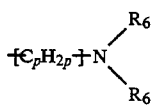

wherein:
m is an integer of from 2 to 8;
p is an integer of from 2 to 6;
$R_5$ is H; $C_1$–$C_8$ alkyl; $C_2$–$C_6$ alkenyl; or —[—qH-29—]—O—$R_7$
wherein q is an integer of from 1 to 4 and $R_7$ is H or $C_1$-
$C_4$ alkyl; $C_6$–$C_{12}$ cycloalkyl or alkylcycloalkyl; the radicals $R_6$, which are the same or different from each other, are:
H; $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

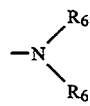

is replaced by a heterocyclic radical linked to the alkyl chain through the nitrogen atom, optionally containing another heteroatom;
or in the general formula (I) the moiety:

is replaced by a heterocyclic radical linked to the triazinic ring through the nitrogen atom, optionally containing another heteroatom;

the other radicals from R to $R_3$, which are the same or different from one another, have the above said meaning, or they are:
H; $C_1$–$C_{18}$ alkyl; $C_2$–$C_8$ alkenyl; $C_6$–$C_{16}$ cycloalkyl or alkylcycloalkyl, optionally substituted with a hydroxy or $C_1$–$C_4$ hydroxyalkyl function;
$R_4$ is $C_1$–$C_8$ alkyl; $C_2$–$C_6$ alkenyl; $C_6$–$C_{12}$ cycloalkyl; $C_6$–$C_{12}$ aryl, optionally substituted with one or more $C_1$–$C_4$ alkyl radicals; aralkyl $C_7$–$C_{16}$; or aralkenyl $C_8$–$C_{12}$,
wherein said one or more polyaminic derivatives in (1) above is selected from the group consisting of urea, ethyleneurea, thiourea, ethylene-thiourea, propyleneurea, melamine, acetoguanamine, propionoguanamine, butyroguanamine, isobutyroguanamine, caprinoguanamine, succinoguanamine, benzoguanamine, metamethylbenzoguanamine, benzylguanamine, hydantoin, piperizine-2,5-dione and barbituric acid.

12. Resins according to claim 11, in which the moiety;

in general formula (I) is replaced by heterocyclic radicals selected from:
aziridine; pyrrolidine; piperidine; morpholine; thiomorpholine, piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; or 2,5-diethylpiperazine.

13. Resins according to claim 11, in which the moiety:

is replaced by a heterocyclic radical selected from:
aziridine; pyrrolidine; piperidine; morpholine; thiomorpholine; piperazine; 4-methylpiperazine; or 4-ethylpiperazine.

14. Resins according to claim 11, in which $R_4$ is selected from:
methyl, ethyl; n-propyl; isopropyl; n-heptyl; isoheptyl; tert-butyl; n-pentyl; isopentyl; n-hexyl; n-heptyl; isoheptyl; n-octyl; ethenyl; propenyl; isobutenyl; sec-butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; or 2-phenylethenyl.

* * * * *